United States Patent
Becker et al.

(10) Patent No.: US 6,339,440 B1
(45) Date of Patent: Jan. 15, 2002

(54) METHOD AND APPARATUS FOR POSITIONING A CURSOR

(75) Inventors: Craig H. Becker, Austin, TX (US); Dave W. Glass, Georgetown, KY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/186,447

(22) Filed: Nov. 5, 1998

(51) Int. Cl.[7] .................................................. G09G 5/08
(52) U.S. Cl. ........................ 345/858; 345/160; 345/162; 345/862; 345/157
(58) Field of Search .................................. 345/145, 156, 345/157, 3, 130, 339, 146, 862, 858, 859, 3.1, 856, 857, 810, 159, 160, 161, 162, 163

(56) References Cited

U.S. PATENT DOCUMENTS

| | | | |
|---|---|---|---|
| 4,881,064 A | * 11/1989 | Nishino | ........................ 340/709 |
| 5,635,954 A | 6/1997 | Yamada | |
| 5,642,131 A | * 6/1997 | Pekelney et al. | ........... 345/145 |
| 5,798,752 A | 8/1998 | Burton | |
| 5,917,486 A | * 6/1999 | Rylander | ..................... 345/339 |
| 6,088,031 A | * 7/2000 | Lee et al. | .................... 345/352 |

\* cited by examiner

Primary Examiner—Vijay Shankar
Assistant Examiner—Mansour M. Said
(74) Attorney, Agent, or Firm—David A. Mims, Jr., Esq.; Russell D. Culbertson, Esq.; Shaffer & Culbertson, LLP

(57) ABSTRACT

A method for positioning a cursor (20) on a display (16) includes receiving a store signal from a user input arrangement associated with a computer system (10). In response to the store signal, a set of display location data is stored in a display location memory array. The set of display location data defines the position of the cursor (20) at the time of the store signal. The user may then move the cursor (20) to any other position on the display (16). In response to a jump signal produced by the user, the stored set of display location data is read from the display location memory array and the cursor (20) is immediately repositioned from its current position to the location defined by the stored set of display location data.

15 Claims, 7 Drawing Sheets

METHOD AND APPARATUS FOR POSITIONING A CURSOR

TECHNICAL FIELD OF THE INVENTION

This invention relates to cursors or other pointer features used to point to a particular location on a display such as a display associated with a computer system. More particularly, the invention relates to a method, apparatus, and program product for rapidly moving a cursor to a prior location on a display.

BACKGROUND OF THE INVENTION

A graphical user interface or GUI for a computer system provides a graphical representation or display on a display device associated with the computer system. The graphical representation allows a user to interact with one or more programs loaded on the computer system. For example, a GUI for a word processing program may provide a graphical representation of a work space on which text may be positioned, and may also provide one or more toolbars. Each toolbar comprises a graphical representation of a series of the buttons or other devices which may be used to invoke various functions of the word processing program. A GUI for a computer-aided design program, for example, may also include one or more work areas and one or more toolbars or other graphical representations through which various program functions may be invoked. As yet another example, an operating system GUI may provide a desktop representation containing a number of icons along with one or more toolbars. Each icon comprises a graphical element which may represent a program, file, or group of files or programs.

When using a GUI to interact with a program or computer system, a user moves a graphical pointing element or cursor to various positions on the display which comprises the GUI. Once the user has positioned the cursor at a desired location on the display, a location containing a toolbar button for example, the user provides an input to invoke the function controlled through the toolbar button. The input may be produced through the cursor positioning device or a separate device such as a keyboard associated with the computer system. A number of different devices have been developed to allow a user to move the cursor on a display. For example, a mouse, trackball, press pad, or joystick, may be used to position a cursor on a display associated with a computer system. In each case, the cursor positioning device commonly includes one more buttons or keys which may be depressed or otherwise activated by the user to provide various inputs. For example, a mouse commonly includes at least two buttons which may be depressed to provide inputs to the computer system. Also, many cursor positioning devices commonly include additional buttons or keys which may each be programmed to provide a desired input.

Although cursor positioning devices allow a user to move the cursor to various locations on a display, positioning the cursor is still predominantly a manual operation. The user must take care to move the cursor to the desired location on the display even if it is a location to which the user returns repeatedly, such as a location containing a frequently used toolbar button. As with any manual operation, manually positioning a cursor on a display is time consuming. Positioning the cursor is even more time consuming in an operating system or program which allows a number of separate windows to be displayed concurrently. The user must first move the cursor to a position on the display to restore the desired window to the display, and then move the cursor to the desired location within the restored window.

SUMMARY OF THE INVENTION

It is an object of invention to provide a method and apparatus for quickly returning a cursor to one or more previous positions on one or more displays. Another object of invention is to provide a program product for enabling a computer system to rapidly return a cursor to one or more previous positions on one or more displays associated with the computer system.

The cursor positioning process according to the invention stores display location data in response to a store signal provided by the user. The display location data defines the location of a cursor on a display at the time of the store signal. Once the display location data is stored, the user may move the cursor to any other position on the display. The user may then provide a jump signal through a suitable user input arrangement. In response to the jump signal, the cursor positioning process according to the invention includes the step of reading the stored display location data and then repositioning the cursor back to the location which is defined by the stored display location data. Thus, the user may store a particular location and then immediately return the cursor to the stored location with a single key stroke rather than having to manually reposition the cursor.

In one preferred form of the invention data for several display locations may be stored in an array. Each element in the array comprises a set of display location data which has been stored in response to a store signal provided by the user. Each set of display location data defines the location of the cursor at the time of the respective store signal. A pointer may be associated with the array to selectively point to the various elements in the array. Each jump input provided by the user manipulates the pointer to select a particular set of previously stored display location data corresponding to a prior cursor location on the display. The process then continues with the steps of reading the selected display location data and then repositioning the cursor to the location on the display which is defined by the particular display location data.

In an alternate form of the invention, a window identifier is included in each set of display location data. The window identifier identifies or defines a GUI window in which the cursor is located at the time of the respective store signal. In this alternate form of the invention, a jump signal also causes the system to restore the window identified by the particular previously stored display location data. Thus, in this alternate form of the invention, a single key stroke or other input (producing a jump signal) repositions the cursor to a particular location on the display within the desired window.

The invention is implemented through computer software code operating on a suitable processor. Under software control, the processor functions as location storing means for storing the desired display location data in a suitable storage device associated with the processor. Also, the processor functions as repositioning means for reading previously stored location data from the storage device in response to a jump signal, and repositioning the cursor to the location on the display defined by the previously stored display location data.

These and other objects, advantages, and features of the invention will be apparent from the following description of the preferred embodiments, considered along with the accompanying drawings.

DESCRIPTION OF THE PREFERRED EMBODIMENTS

Figure 1:
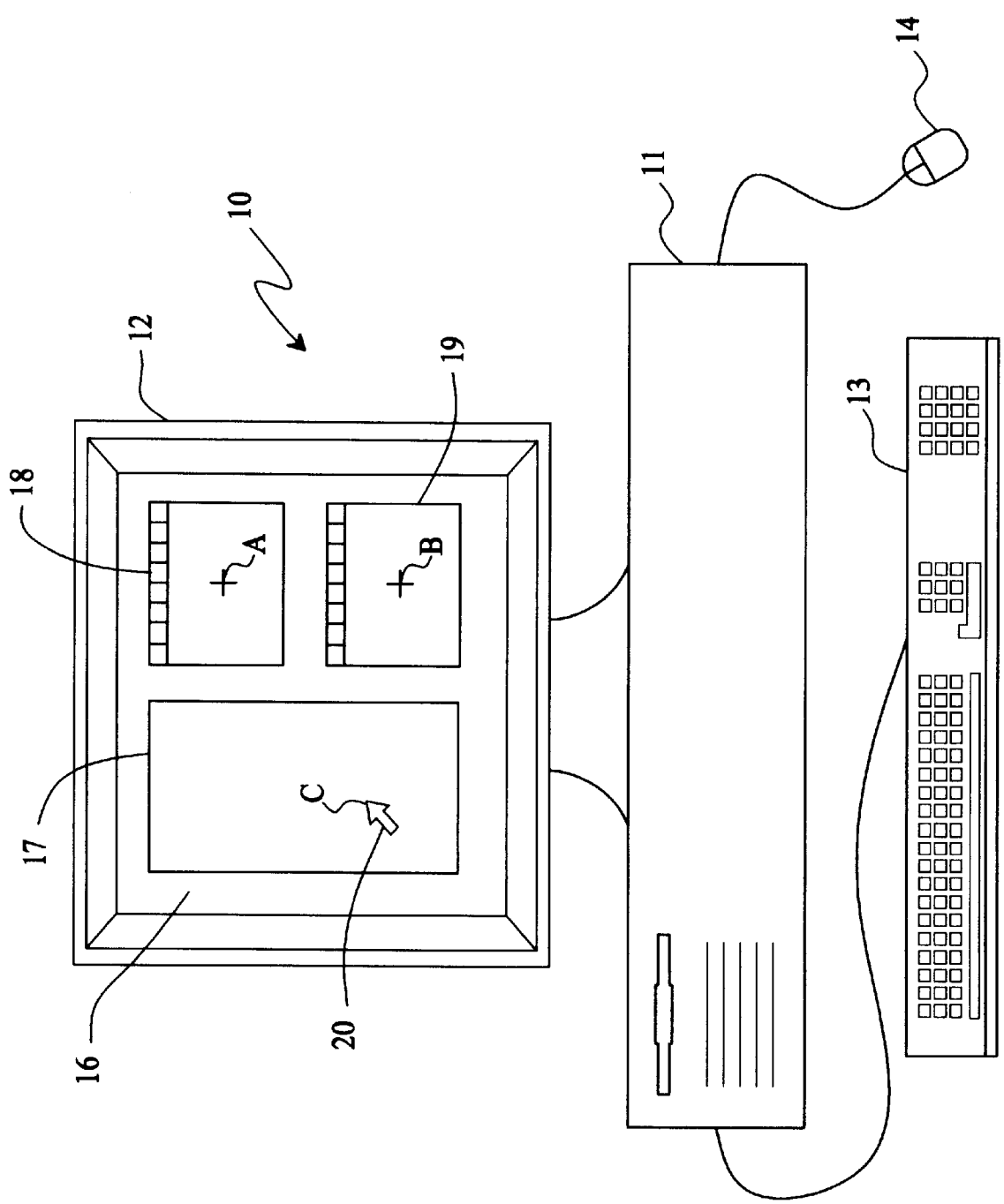
FIG. 1 is a diagrammatic representation of a computer system having a user input arrangement and a display on which a cursor may be positioned according to the invention.

FIG. 1 illustrates a computer system 10 which may be programmed to perform a cursor positioning process embodying the principles of the invention. Computer system 10 includes a processor 11 having an associated memory device (not shown separately). The memory device associated with processor 11 may be a mass storage device such as a hard drive or floppy disk drive, or may be random access memory associated with the processor. Computer system 10 also includes a display device 12 and a user input arrangement including keyboard 13 and mouse 14.

Each peripheral device associated with computer system 10 such as display device 12, mouse 14, and keyboard 13, has associated driver software which is executed by processor 11 to allow the computer system to communicate with the particular peripheral device. The device drivers and particular nature of the peripheral devices do not form part of this invention and will not be discussed in further detail in this disclosure. In any event, details regarding particular peripheral devices and their associated device drivers are within the knowledge of those skilled in this field.

Display device 12 provides a display 16 which may contain various images including windows, icons, and toolbars, for example. The display 16 illustrated FIG. 1 comprises a GUI having three separate windows 17, 18, and 19. Display 16 also shows a cursor 20 at location C and two previous display locations marked by the crosses A and B. It will be understood that the crosses marking previous display locations A and B do not actually appear on display 16 and are shown in FIG. 1 only for convenience in describing the invention.

The illustrated display 16 comprises a two-dimensional display and each location on the display may be defined in terms of a Cartesian coordinate system by a displacement along an X axis and a displacement along a Y axis. Although the invention is illustrated in terms of a two-dimensional display for purposes of convenience, those skilled in the art will appreciate that the invention is also applicable to three-dimensional displays.

Also, although a single display is illustrated in FIG. 1 for purposes of convenience, the invention may be used to position a cursor on an arrangement of more than one display. As used in this disclosure and the following claims, the term "display" includes both a single display and a display arrangement made up of two or more separate displays.

The invention will be described in this disclosure with reference to the computer system 10 shown FIG. 1. However, the invention is applicable to any system which provides a display, a suitable storage device, and a user input arrangement for moving a cursor within the area of the display and through which a user may provide store and jump signals. Any such system is to be considered an equivalent to the computer system 10 illustrated FIG. 1 and set out in the following claims.

Referring still to FIG. 1, display locations A and B illustrate locations for which location data has been previously stored according to the invention. The previous display location data for a location is stored by positioning the cursor at the particular location and then providing a store signal through the user input arrangement, in this case either mouse 14 or keyboard 13, or both. Although the mouse 14 and keyboard 13 are shown for purposes of example in FIG. 1, the user input arrangement may include other devices such as a press pad, trackball, or joystick for example, each device having any combination of additional keys, buttons, or switches for producing an input. The user input arrangement may also include a voice command arrangement. These types of user input devices are to be considered equivalents to the user input devices illustrated FIG. 1. In any event, one or more of the devices included in the user input arrangement may include a programmable button or switch which may be programmed to provide the store signal.

In response to a store signal, processor 11 functions as location storing means to store display location data in the memory device associated with the processor. In the preferred form of invention the display location data is stored in a display location memory array with each element in the array comprising a single set of display location data defining a particular location on the display, such as location A or B shown on display 16 in FIG. 1. In the two-dimensional display form of the invention illustrated in FIG. 1, each set of display location data includes an X and a Y coordinate. Also, each set of display location data in the array preferably has associated with it a pointer for identifying the respective set of display location data. In the preferred form of the invention the display location array is implemented as a circular array.

It will be appreciated that the invention may be used with a three-dimensional display rather than the two-dimensional display illustrated in FIG. 1. In the three-dimensional display application, each set of display location data will include an X, Y, and Z coordinate. Additional data must also be included in each set of display location data when the overall display is made up of several separate displays. In the multiple display arrangement, a display identifier must be included in the set of display location data.

Once display location data is stored for a particular location, the user may move the cursor 20 to any other location within display 16, such as the current location C shown in FIG. 1, for example. To move the cursor back to a previous location for which location data has been stored, the user provides a jump signal through the particular user input arrangement. As with the store signal, the jump signal may be provided through the mouse 14, keyboard 13, or any other input device included in the user input arrangement. In response to the jump signal, processor 11 functions as repositioning means to read the particular previously stored display location data and then reposition the cursor 20 to the location defined by that data. In the preferred form of the invention, each jump signal causes the processor 11 to move the cursor 20 to a different display location for which location data has been stored. For example, a first jump signal may move cursor 20 from location C in FIG. 1 to location A, while a second jump signal may move the cursor from location A to location B. Finally, a third jump signal may move the cursor 20 from location B back to location C.

It will be understood that the invention is not limited to storing locations for any particular types of graphical elements which may be included on a display. Any of the stored locations A, B, or C, for example, may be a location for an icon, text item, menu list or menu item, or a text/image link in a web browser.

One preferred process according to the invention is illustrated in the flow charts shown in FIGS. 2 through 6.

Figure 2:
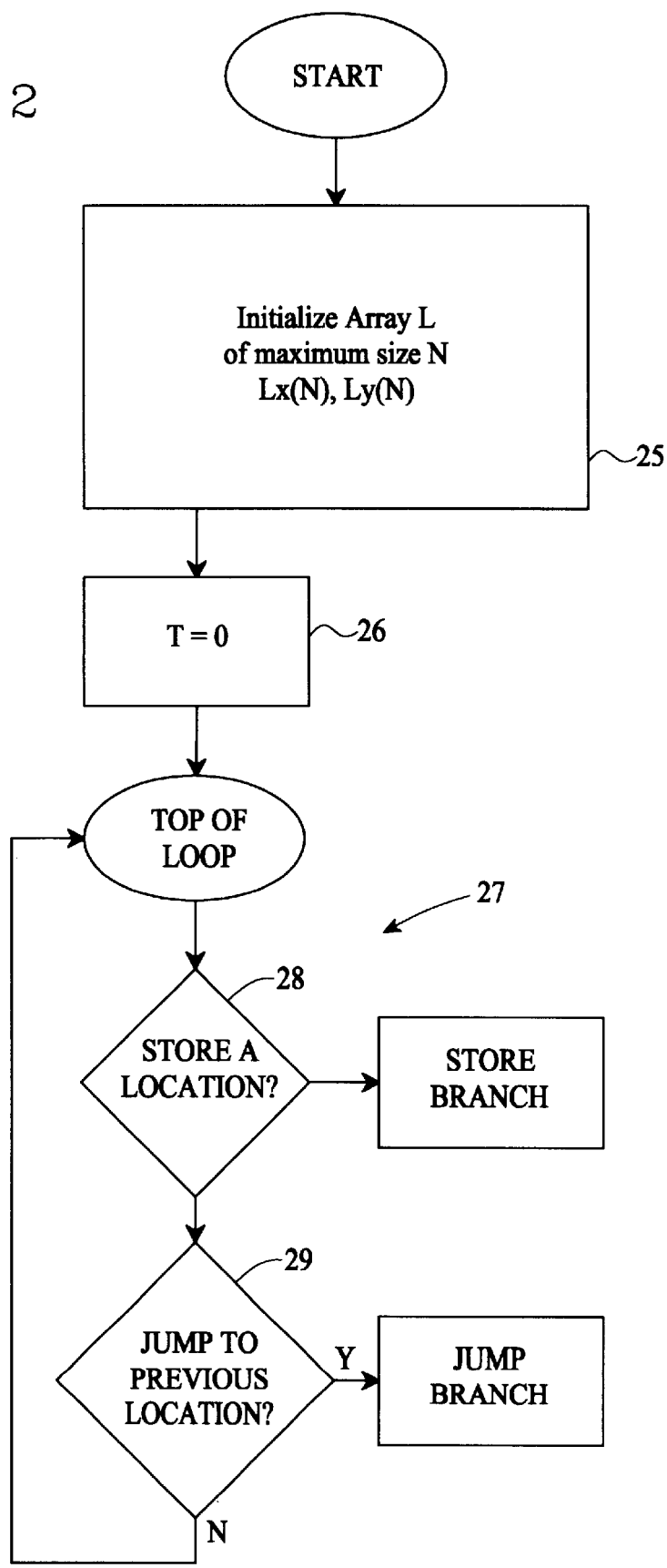
FIGS. 2 through 6 are flow charts showing one preferred cursor positioning process embodying the principles of invention.

Referring to FIG. 2, the process commences at step 25 by initializing a display location memory array L. In this form of the invention array L may have a maximum of N elements, that is, N sets of display location data, each set defining a particular location on the display (16 in FIG. 1). When defining a location in two dimensions each set of location data comprises a value $L_x(N)$ and a value $L_y(N)$. $L_x(N)$ comprises an X coordinate value while $L_y(N)$ comprises a Y coordinate value. Each set of display location data also has associated with it a pointer T which identifies a particular set of display location data in the array. The pointer T is set to zero at step 26.

The process shown in FIG. 2 proceeds in a loop 27. At decision step 28, the processor 11 (FIG. 1) determines whether the user has initiated a store signal. If a store signal is detected, the process moves to a storing branch shown in FIG. 3. If no store signal is detected, the process moves to decisions step 29. At step 29, processor 11 determines whether the user has initiated a jump signal. If a jump signal is detected, the process moves to a jump branch which will be described with reference to FIG. 5. If neither the store signal nor jump signal is detected, the process moves back to the top of loop 27 and repeats steps 28 and 29.

Figure 3:
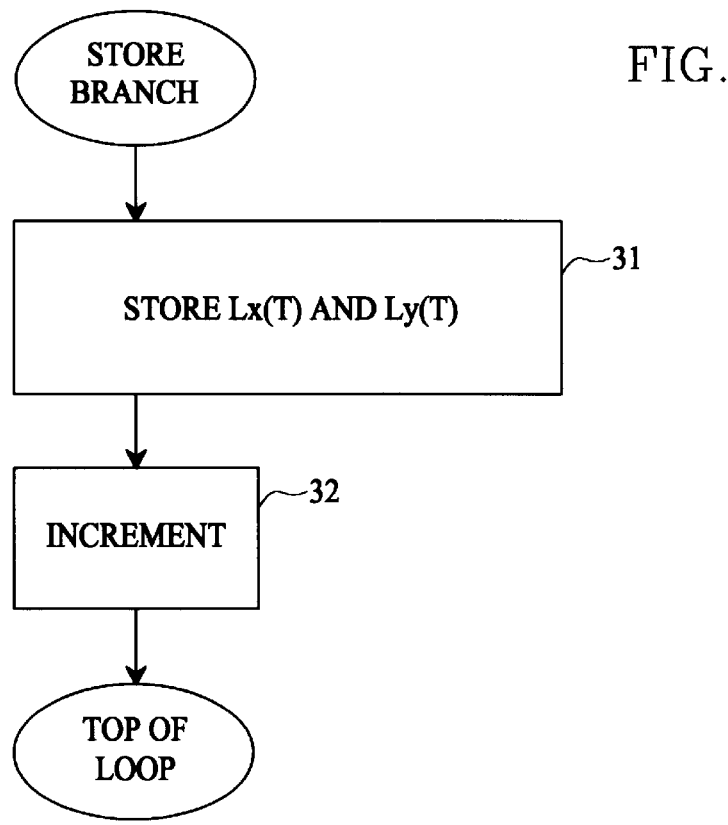
Figure 4:
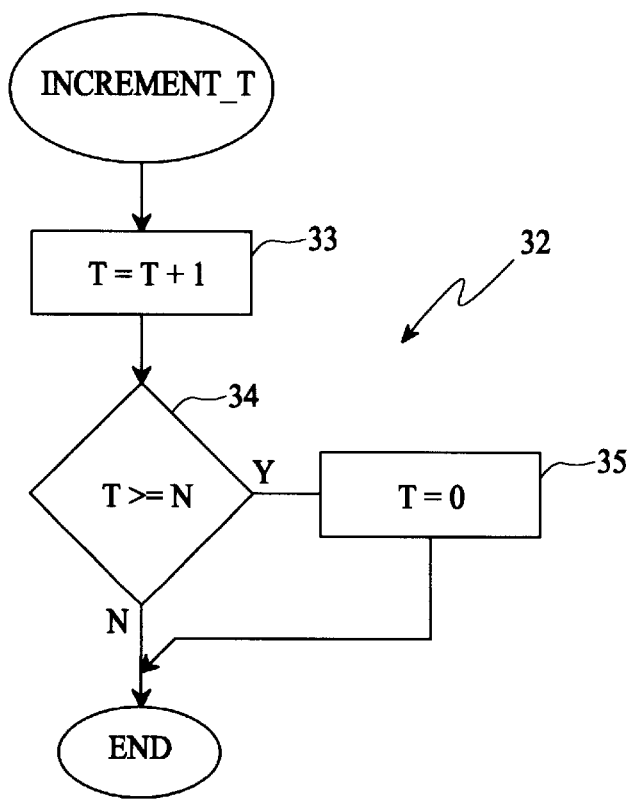

Referring to FIG. 3, at step 31 the store branch includes storing the current cursor location in the display location memory array L as element L(0), which includes the values $L_x(0)$ and $Ly(0)$ defining the current cursor location. In this sense, the current cursor location is generally the location of the cursor at the time of the store signal. The pointer T is then incremented at step 32 before the process returns to the top of loop 27 shown in FIG. 2. As shown in FIG. 4, incrementing pointer T comprises simply adding one to the current value of T at step 33 and then at step 34 determining whether the new value of T is greater than or equal to the maximum size N of the array. In this illustrated form of the invention, if the value of pointer T is greater than or equal to the maximum size of the array, T is reset to zero at step 35. In other words the pointer T is moved to the first element in array L.

Figure 5:
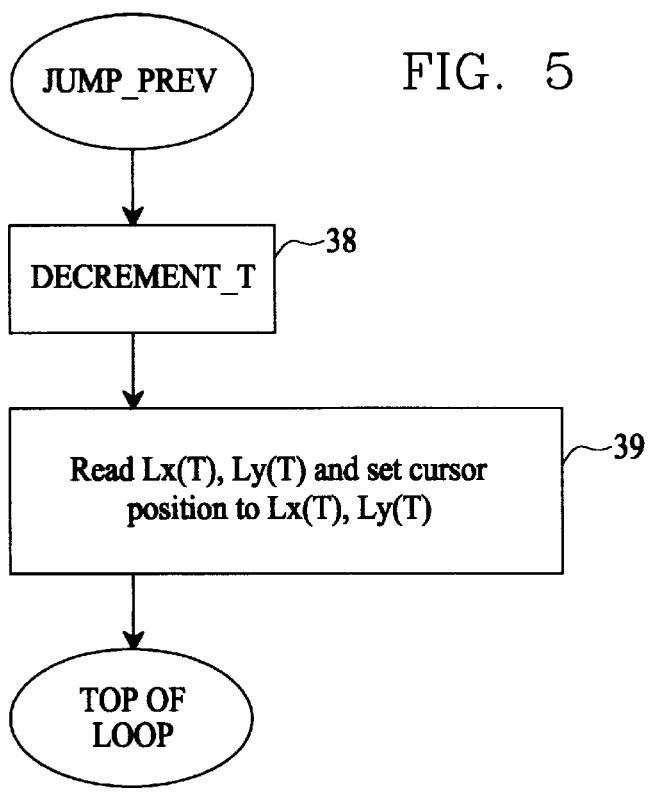
Figure 6:
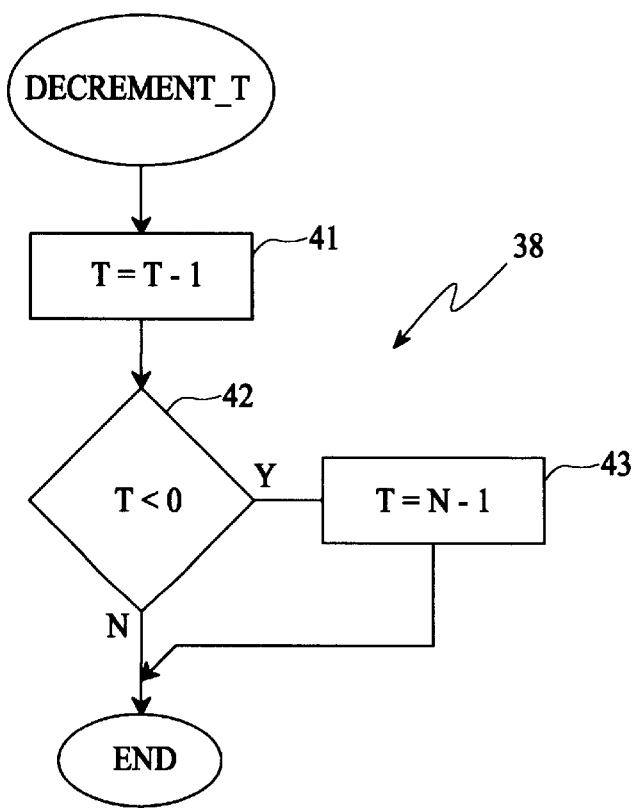

Referring to FIG. 5, the jump branch first decrements the value of pointer T at step 38 and then at step 39 reads the location data stored in the array element associated with the new value of T. After reading the location data, step 39 includes performing a call to position the cursor at the display location defined by that location data. That is, the process performs a call to move the cursor from its current location to the display location defined by $L_x(T)$ and $L_y(T)$. Finally, the jump branch returns to the top of loop 27 shown in FIG. 2. Referring to FIG. 6, the process of decrementing the value of the pointer T includes at step 41 subtracting one from the then current value of T. Step 42 comprises determining whether the resulting value of T is less than zero. If the value of T is less than zero, T is set to N−1 at step 43 where N equals the maximum number of elements in the display location memory array L. Thus, if subtracting one from T results in a value less than zero (T=0 representing the first element in array L) T is set to point to the last set of display location data in the array L.

Figure 7:
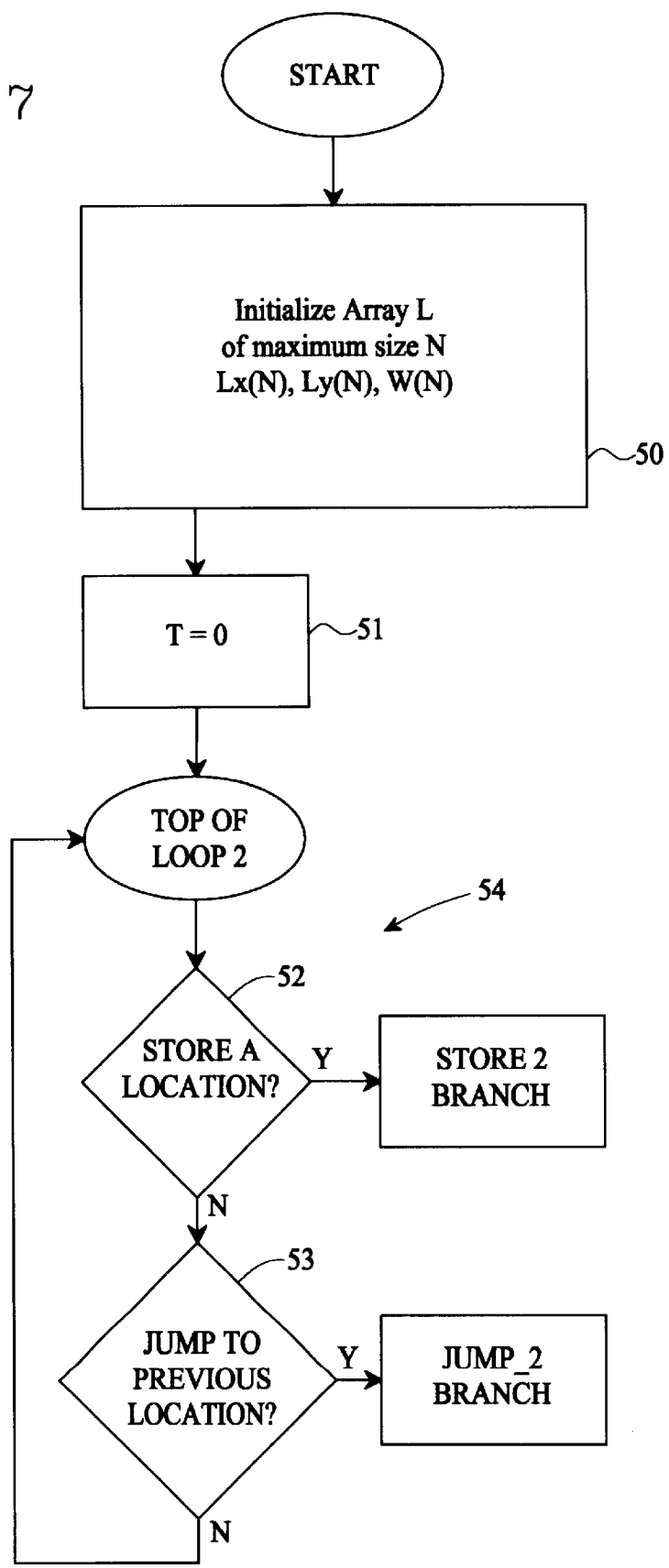
FIGS. 7 through 9 are flow charts showing a window-sensitive cursor positioning process embodying the principles of invention.
Figure 8:
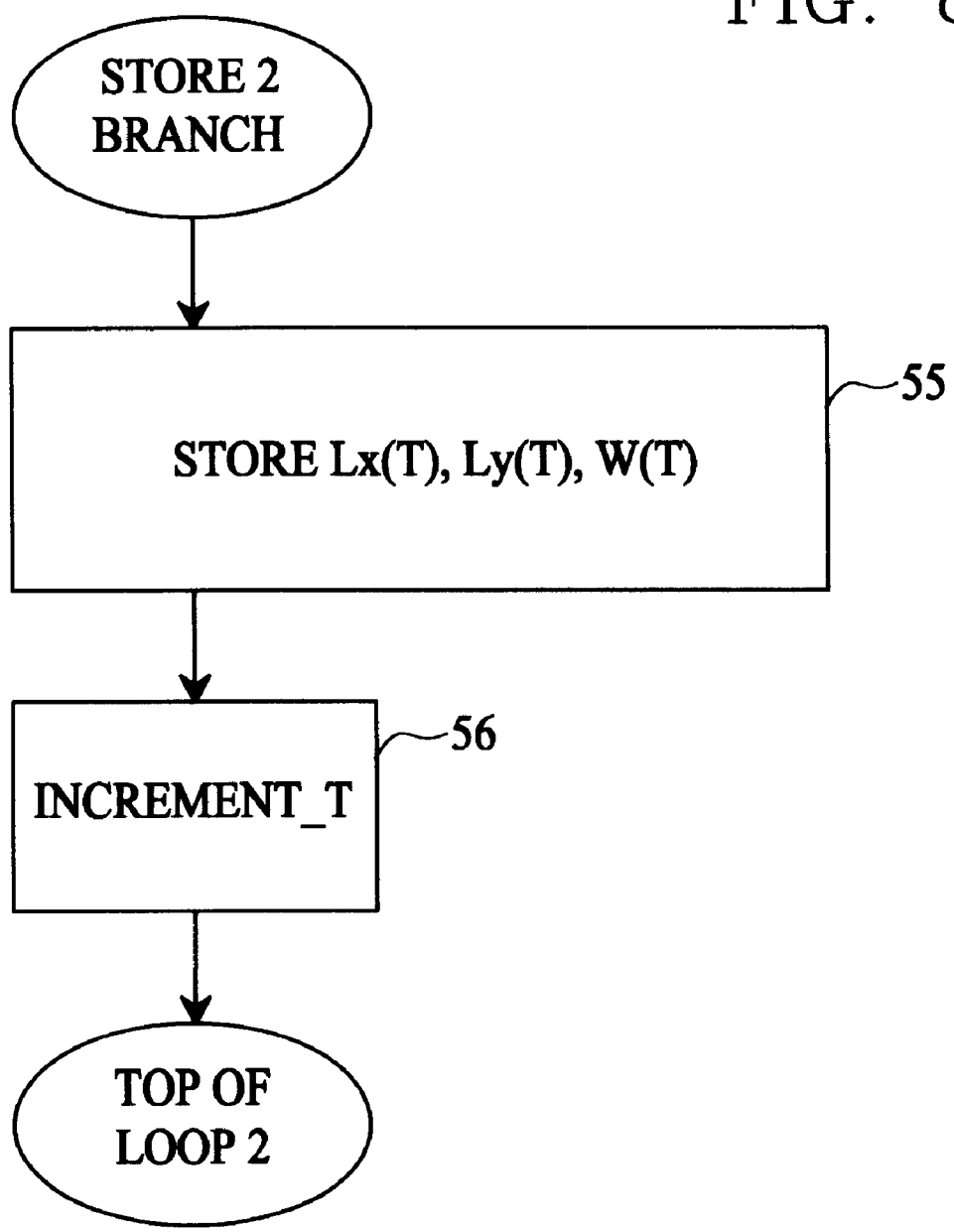
Figure 9:
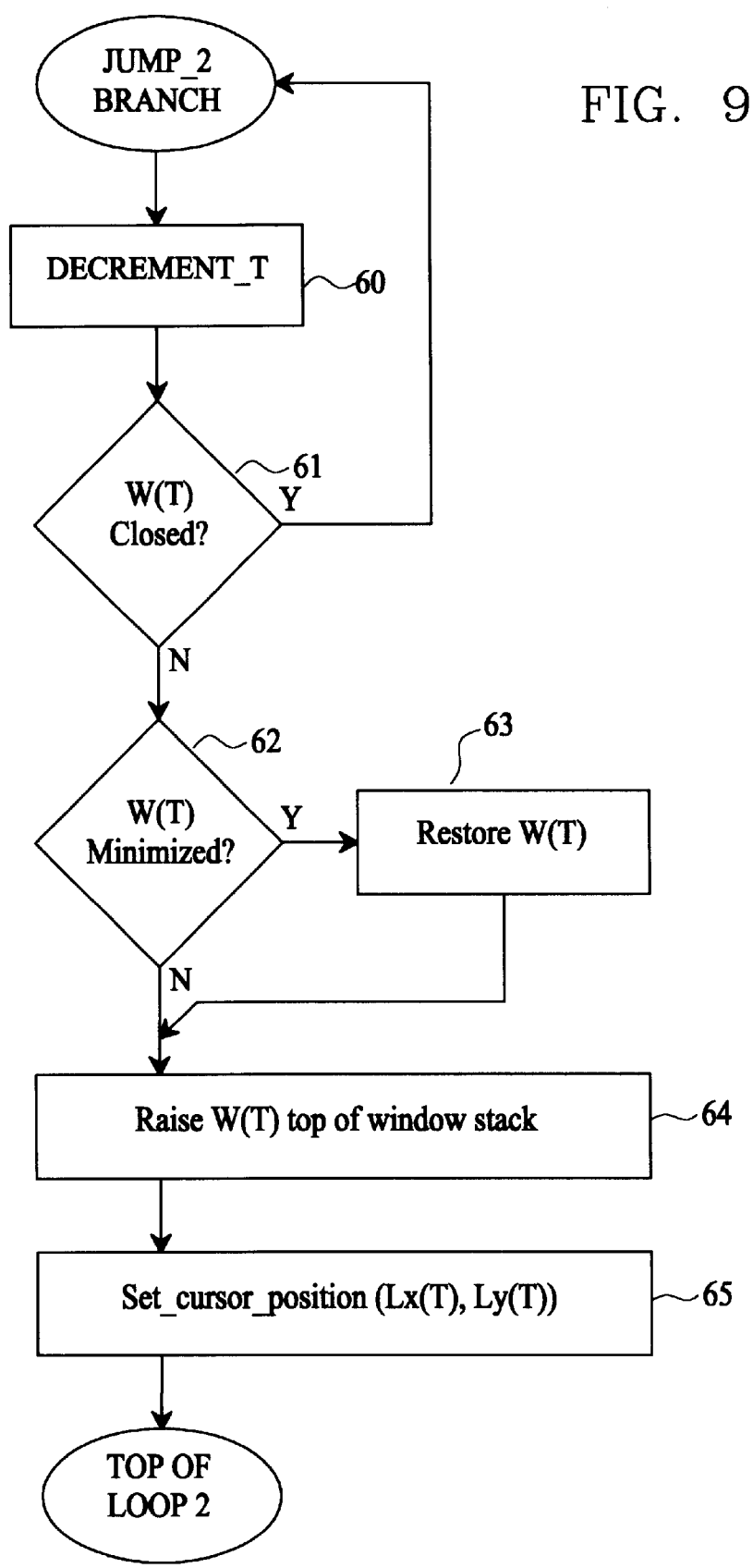

FIGS. 7 through 9 illustrate an alternate process according to the invention which is sensitive to the window in which a particular display location may be contained. Referring to FIG. 7, the process begins with step 50, initializing an array L having a maximum of N elements. Each element in array L will comprise a set of display location data including an X coordinate $L_x(N)$, a Y coordinate $L_y(N)$, and a window pointer W(N). At step 51 a pointer T is initially set to zero. As with the process disclosed in FIGS. 2 through 6, a value of pointer T is associated with each set of display location data in array L. The process shown FIG. 7 operates in loop 54 and includes decision steps 52 and 53 which are similar to the steps 28 and 29 shown in FIG. 2. At step 52 the processor 11 (FIG. 1) determines whether a store signal has been received and if so branches to the store branch illustrated in FIG. 8. At step 53 processor 11 determines whether a jump signal has been received and if so moves to the jump branch illustrated in FIG. 9.

As shown in FIG. 8, the store process includes at step 55 storing the current cursor location coordinates in display location memory array L. An identifier for the current window W(T) is also included in the set of display location data along with the X and Y coordinates, $L_x(T)$ and $L_y(T)$. At step 56, the store branch increments the value of T similarly to the process shown in FIG. 4 before returning to the top of loop 54.

Referring to the FIG. 9, at step 60 the jump branch first decrements the value of T in the same manner as shown in FIG. 6. At step 61 the processor 11 (FIG. 1) reads the display location data indicated by pointer T and determines whether the window W(T) included in the display location data at element T is open or closed. If the associated window is closed, the process loops to the top of the jump branch and decrements T again. However, if the associated window W(T) is not closed, the process continues at step 62 with determining whether the associated window is minimized. If window W(T) is minimized then the window is restored at step 63. After restoring window W(T) or if the window is not minimized, the process continues with step 64 in which the particular window is raised to the top of the window stack so that the window included in the selected set of display location data is not hidden beneath another window. Finally, at step 65 the processor 11 (FIG. 1) repositions the cursor to the location on the display defined by the stored display location data L(T) before returning to the top of main loop 54 in FIG. 7.

Although the process shown in FIG. 7 refers to a "window," those skilled in the art will appreciate that the same process may be used to restore other graphical elements. For example, the system may also restore an icon to the display. Any graphical element which may be restored on a display is to be considered an equivalent to the "window" element set out in this disclosure and the following claims.

The above described preferred embodiments are intended to illustrate the principles of the invention, but not to limit the scope of the invention. Various other embodiments and modifications to these preferred embodiments may be made by those skilled in the art without departing from the scope of the following claims. For example, the sets of display location data may be stored in any suitable manner and need not be stored in the form of an array. It is required only that the sets of location data be stored in a manner which will allow the individual sets to be selected and read in response to a jump signal. These other data storing arrangements are to be considered equivalents of the memory described above and in the following claims. Also, the invention may be applied to a virtual display which has an area larger that the area of a display screen provided by a particular display device. In that case the set of display location data will include data elements which will allow the desired area of the virtual display to be displayed on the particular display device. Furthermore, in the window-sensitive implementation of the invention illustrated in FIGS. 7 through 9, the jump process ignores a set of location data if the identified window is closed. Other implementations of the invention may include sufficient information in each set of display location data to actually reopen the window as opposed to simply restoring a minimized window.

What is claimed is:

1. A method for positioning a cursor on a display associated with a computer system, the method comprising the steps of:
   (a) receiving a store signal from a user input arrangement associated with the computer system;
   (b) in response to the store signal, storing a set of display location data defining the location of the cursor on the display at the time of the store signal, the set of display location data being stored in a display location array in a memory device associated with the computer system, the display location array also storing at least one previously stored set of display location data, each previously stored set of display location data defining the location of the cursor on the display at the time of a different previous store signal received from the user input arrangement;
   (c) receiving a jump signal from the user input arrangement;
   (d) in response to the jump signal, reading the set of display location data from the memory device and repositioning the cursor on the display from a current location to the display location defined by the set of display location data, the current location being the location of the cursor on the display at the time of the jump signal;
   (e) receiving at least one additional jump signal from the user input arrangement; and
   (f) in response to each additional jump signal, reading one of the previously stored sets of display location data from the display location array and repositioning the cursor on the display from a then current location to the display location defined by the respective previously stored set of display location data, the then current location being the location of the cursor at the time of the respective additional jump signal.

2. The method of claim 1 wherein the display location array comprises a circular array.

3. The method of claim 1 further comprising the step of incrementing a pointer in response to the store signal, the pointer defining a selected set of display location data stored in the display location array.

4. The method of claim 1 further comprising the step of decrementing a pointer in response to the jump signal, the pointer defining a selected set of display location data stored in the display location array.

5. The method of claim 1 wherein the set of display location data further defines a window in which the cursor is located on the display at the time of the store signal, and further comprising the step of:
   (a) in response to the jump signal, restoring the window defined by the set of display location data.

6. A program product for positioning a cursor on a display associated with a computer system, the computer system further having a user input arrangement through which a user may input a store signal and a jump signal, the program product comprising:
   (a) location storing means comprising computer readable program code for causing the computer system to store a set of display location data and at least one set of additional display location data in a display location memory array, the set of display location data defining the location of the cursor on the display at the time of the store signal, and each set of additional display location data defining the location of the cursor on the display at the time of a different previous store signal received from the user input arrangement; and
   (b) repositioning means comprising computer readable program code for causing the computer system to read the set of display location data from the display location memory array in response to the jump signal and then reposition the cursor on the display from a current location to the location defined by the set of display location data, the current location being the location of the cursor on the display at the time of the jump signal, the repositioning means also comprising computer readable program code for causing the computer system to read one set of additional display location data from the display location memory array in response to an additional jump signal, and to reposition the cursor on the display from a then current location to the display location defined by the respective set of additional display location data, the then current location being the location of the cursor at the time of the additional jump signal.

7. The program product of claim 6 wherein the display location memory array comprises a circular array.

8. The program product of claim 6 wherein the location storing means further causes the computer system to increment a pointer in response to the store signal, the pointer defining a selected set of display location data stored in the display location memory array.

9. The program product of claim 6 wherein the repositioning means further causes the computer system to decrement a pointer in response to the jump signal, the pointer defining a selected set of display location data stored in the display location memory array.

10. The program product of claim 6 wherein the set of display location data further defines a window in which the cursor is located on the display at the time of the store signal, and the repositioning means further causes the computer system, in response to the jump signal, to restore the window defined by the set of display location data.

11. A computer system having a display on which a cursor is displayed, and also having a user input arrangement through which a user may provide a store signal and a jump signal, the computer system further comprising:
   (a) location storing means for storing a set of display location data in a display location memory array in response to the store signal, the set of display location data defining the location of the cursor on the display at the time of the store signal, the location storing means also for storing at least one set of additional display location data in the display location memory array, each set of additional display location data defining the location of the cursor on the display at the time of a different previous store signal received from the user input arrangement; and
   (b) repositioning means for reading the set of display location data from the display location memory array in response to the jump signal and repositioning the cursor on the display from a current location to the display location defined by the set of display location data, the current location being the location of the cursor on display at the time of the jump signal, the repositioning means also for reading one set of additional display location data from the display location memory array in response to an additional jump signal, and for repositioning the cursor on the display from a then current location to the display location defined by the respective set of additional display location data, the then current location being the location of the cursor at the time of the additional jump signal.

12. The computer system of claim 11 wherein the display location memory array comprises a circular array.

13. The computer system of claim 11 wherein the location storing means is also for incrementing a pointer in response to the store signal, the pointer defining a selected set of display location data stored in the display location memory array.

14. The computer system of claim 11 wherein the repositioning means is also for decrementing a pointer in response to the jump signal, the pointer defining a selected set of display location data stored in the display location memory array.

15. The computer system of claim 11 wherein the set of display location data further defines a window in which the cursor is located on the display at the time of the store signal, and the repositioning means is also for restoring said window in response to the jump signal.

* * * * *